Sept. 30, 1941.　　　　S. RUBEN　　　　2,257,129
MAGNESIUM PRIMARY CELL
Filed Dec. 19, 1939
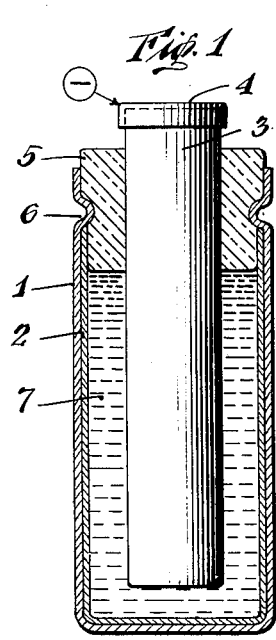
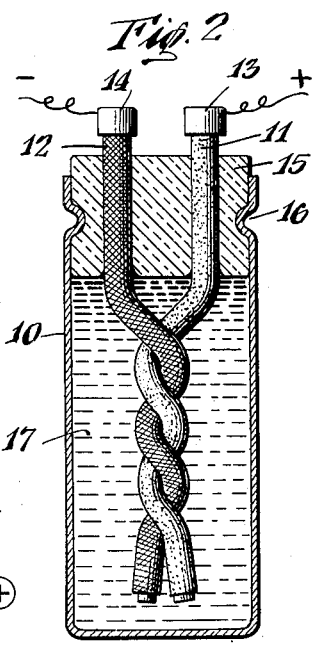
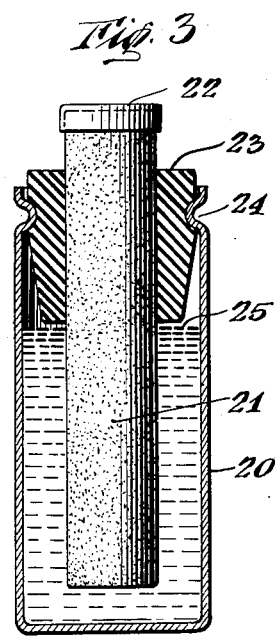
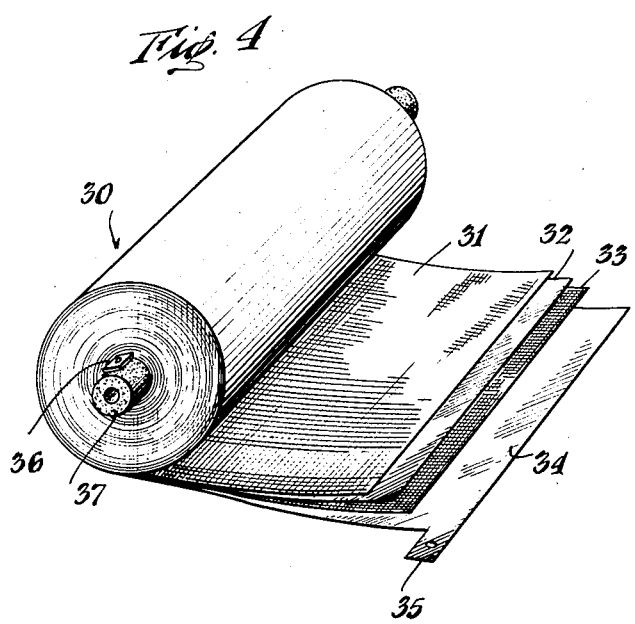
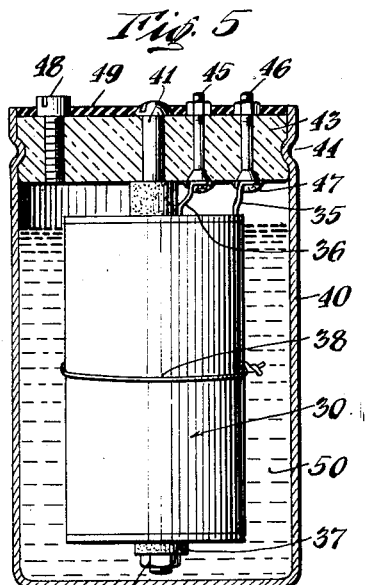
INVENTOR
Samuel Ruben
BY
ATTORNEY Patented Sept. 30, 1941

2,257,129

UNITED STATES PATENT OFFICE 2,257,129

MAGNESIUM PRIMARY CELL

Samuel Ruben, New Rochelle, N. Y.

Application December 19, 1939, Serial No. 309,993

8 Claims. (Cl. 136—100)

This invention relates to a primary cell; specifically to a cell employing magnesium as the negative plate element. This application is a continuation in part of my pending application bearing Serial Number 115,695 filed December 14, 1936.

An object of the invention is the provision of a cell having a higher output than cells now in use, which has a long life and which may be economically and readily manufactured.

Another object is the provision of a primary cell which will maintain its potential over a substantial part of its operating life.

A further object is the provision of a primary cell capable of supplying current over sustained periods without excessive polarizing effects.

A further object is the provision of a cell having a high power output for a given weight and volume.

Another object is the provision of such a cell having a low shelf life loss.

Other objects will be apparent from the disclosure and from the drawing in which Figs. 1 and 3 show typical simplified constructions in which one electrode is in the form of a rod and a cooperating electrode comprises the container.

In Fig. 2 is shown a form of construction in which the electrodes are composed of wires twisted together, but insulated from each other.

In Fig. 4 is shown a construction in which the electrodes are in the form of foil rolled together with inter-leaving insulation.

Fig. 5 shows the rolled condenser of Fig 4 housed in a metal container.

The invention may be said to comprise a primary cell having a negative plate of magnesium, a cooperating electrode and an electrolyte comprising chromic acid and a fluoride of one or more of the metals potassium, sodium, rubidium, cesium and lithium.

Although the prior art discloses the use of a magnesium electrode in an electrolyte of chromic acid, such batteries are not commercially used. The present day primary cell uses a zinc electrode for the reason that magnesium, in available electrolytes, although it delivers more current, shows a higher corrosion and a much greater loss of weight, the magnesium being consumed at a much greater rate of speed.

I have found that when chromic acid is used as an electrolyte the magnesium becomes passive and the voltage rapidly drops to a negligible value. A similar result obtains when potassium fluoride is used as an electrolyte. However, when potassium fluoride in proper proportion is added to the chromic acid, the magnesium becomes passive when no current is drawn, but when current is consumed the magnesium re-acts with and dissolves into the combined solution and a potential of about two volts is generated with a current density dependent in part upon the internal resistance of the cell.

While many salts will reduce or eliminate the passivity of magnesium in chromic acid, they will also cause rapid dissolution of the magnesium; among such unsuitable salts may be mentioned chlorides in general, or fluorides such as chromium fluoride or other non-alkali metal fluoride compounds.

In the preparation of the electrolyte I preferably use the minimum amount of fluoride necessary to prevent the magnesium from becoming passive as this tends to minimize shelf life loss. The quantity of fluoride added will depend upon the concentration and volume of the chromic acid. Where a 50% chromic acid solution is employed with potassium fluoride, the addition of the latter compound in an amount as low as 5 milligrams per 100 grams of solution will reduce passivity. An excessive amount of potassium fluoride will cause rapid local action and consumption of magnesium.

I have tried other anions such as the sulphates, nitrates, etc., in place of the alkali metal fluoride, but they caused excessive attack of the magnesium. I have also tried other halogen salts such as the iodides and chlorides, and while they will initially function in a manner similar to the alkali metal fluorides, they cause a decrease in shelf life by continuous attack of the magnesium electrode even when no current is being discharged.

The improved practical results as far as my tests show, are obtainable only by the use of the alkali metal fluoride salt. It is possible that the function of the fluoride may in part be that of reducing the amount of chromium chromate formed in operation of the cell, the chromium chromate being a colloidal compound of trivalent and hexavalent chromium, the first reduction produce of chromic acid.

By having the best balance between the chromic acid content and the fluoride content, a condition is obtained where with no current flow the attack on the magnesium is of low order, the magnesium becoming substantially passive under such conditions. This condition is evidenced by the behavior of the cells—for example a cell which might show a potential of 1.9 volts when first connected may have a potential of two volts immediately thereafter, thus indicating that the passive condition has been reduced during operation.

It is desirable that the magnesium be as pure as possible and that the chromic acid alkali metal fluoride solution be as free as possible from impurities and other anions, especially chlorides. Preferably the magnesium is used in rod or in cast form, as there appears to be a greater consumption of magnesium when it is utilized in thin sheet form, the magnesium being consumed at a much faster rate probably due to the presence of magnesium oxide rolled into the sheet during the process of reduction. It is desirable also that the magnesium be coated or insulated at the junction between the solution and the air space, as the drying of the solution due to creepage at the air line causes corrosion.

The cooperating electrode may be carbon or carbonized nickel.

In order to more particularly describe the invention reference is made to the attached drawing.

In the liquid type cell shown in Fig. 1, steel container 1, has a lining of carbonized nickel 2, spot welded to its inner wall, the carbonized nickel constituting the positive plate of the battery. Magnesium rod 3, constituting the negative electrode of the battery, and having a contacting non-oxidizing brass cap 4, is forced through insulator top 5, composed of porcelain impregnated with Koroseal to provide a seal when the steel cylinder is rolled into groove 6. Electrolyte 7 is composed of aqueous solutions of chromic acid and potassium fluoride.

In Fig. 2 is shown another type of cell having a low internal resistance. Negative electrode 12, is formed of magnesium wire having a covering of glass fibre thread, and positive plate 11, is formed of carbonized nickel wire, the two electrodes being twisted together as indicated, the porous glass fibre serving as an insulating spacer therebetween. The electrodes are provided with non-oxidizing metal caps 13 and 14. The electrode wires are forced through insulator top 15 and extend into electrolyte 17. Steel container 10, is rolled into insulator groove at 16.

In Fig. 3 the container 20, is drawn from magnesium and the centrally located cooperating electrode 21 is a carbon rod having a brass cap 22, the rod being forced through insulator 23 and extending into electrolyte 25. The container is rolled into insulator groove at 24.

In Fig. 4 is shown a rolled battery structure 30, in which magnesium sheet 32 and carbonized nickel sheet 34 are rolled with interleaving sheet glass fibre cloths 31 and 33 into rolled form on mandrel 37. Tab 35 is the terminal for the positive plate and tab 36 is the terminal for the negative plate.

Fig. 5 shows the rolled battery structure of Fig. 4 housed in steel container 40, and immersed in electrolyte 50. The roll 30 is bound with wire 31 and the rolled elements are suspended in the electrolyte by screw 41 which passes through mandrel 37, and is locked on by nut 42. The terminals 35 and 36 are protected by insulation of Koroseal 47 and passed through insulator top 43, outside connections being made at 45 and 46.

The insulator top 43, against which the container 40 is pressed at groove 44, has its top impregnated with Koroseal 49. Vent 48 permits the escape of gas and filling of solution.

Koroseal has been found to be the material most capable of withstanding the effect of the chromic acid and is a polymer of vinyl halides, specifically the polymer of vinyl chloride. The lowest percentage of potassium fluoride necessary to give the maximum voltage over the life of the cell under operating conditions will give a minimum shelf life loss. This will vary with the quantity of solution and the size of the magnesium electrodes. Cast electrodes have been found to be best. The chromic acid concentration should be 50% or more, for a lower concentration increases the shelf life loss. For instance, with the present cell, a 25% concentration such as is used in prior art chromic acid cells, will produce a shelf life loss 2.8 times that of a 50% concentration, the percentage of potassium fluoride present being the same in each case. For lower concentrations, the loss is even more pronounced.

What I claim is:

1. A primary cell comprising a negative electrode of magnesium, a cooperating positive electrode and an electrolyte comprising aqueous solutions of chromic acid and a fluoride of at least one of the metals, potassium, sodium, rubidium, caesium and lithium.

2. A primary cell comprising a negative electrode of magnesium, a positive electrode and an electrolyte comprising chromic acid and potassium fluoride.

3. A primary cell comprising a negative electrode of magnesium, a positive electrode and an electrolyte comprising chromic acid and sodium fluoride.

4. A primary cell comprising a negative electrode of magnesium, a positive electrode of carbon material and an electrolyte comprising chromic acid and a fluoride of an alkali metal of the first periodic group.

5. A primary cell comprising a negative electrode of magnesium, a positive electrode of carbon material and an electrolyte comprising chromic acid and potassium fluoride.

6. A primary cell comprising a negative electrode of magnesium, a positive electrode of carbon material and an electrolyte comprising chromic acid and sodium fluoride.

7. A primary cell having a negative electrode of magnesium, a positive electrode and an electrolyte comprising aqueous solutions of chromic acid and a fluoride of an alkali metal of the first periodic group, the chromic acid being present in a greater proportion than the fluoride.

8. A primary cell having a negative electrode of magnesium, a positive electrode, and an electrolyte comprising aqueous solutions of chromic acid and an alkali metal fluoride, the chromic acid being present in a preponderant percentage, the amount of alkali metal fluoride present being sufficient to permit said magnesium to become active when current is drawn from said cell.

SAMUEL RUBEN.